(12) United States Patent
Antle

(10) Patent No.: US 10,143,180 B2
(45) Date of Patent: Dec. 4, 2018

(54) METHOD OF FEEDING A CARNIVORE AND DEVICE

(71) Applicant: Bhagavan Antle, Myrtle Beach, SC (US)

(72) Inventor: Bhagavan Antle, Myrtle Beach, SC (US)

(*) Notice: Subject to any disclaimer, the term of this patent is extended or adjusted under 35 U.S.C. 154(b) by 463 days.

(21) Appl. No.: 14/936,138

(22) Filed: Nov. 9, 2015

(65) Prior Publication Data

US 2017/0127646 A1    May 11, 2017

(51) Int. Cl.
*A01K 5/00* (2006.01)

(52) U.S. Cl.
CPC ...................................... *A01K 5/00* (2013.01)

(58) Field of Classification Search
CPC . A01K 1/00; A01K 1/02; A01K 1/029; A01K 1/0218; A01K 1/0227; A01K 1/0236; A01K 1/0245; A01K 1/03; A01K 1/031; A01K 1/032; A01K 1/033; A01K 5/00; A23K 40/25; A23K 50/40; A23K 50/45; A23K 50/48
See application file for complete search history.

(56) References Cited

U.S. PATENT DOCUMENTS

| | | | | |
|---|---|---|---|---|
| 3,156,213 A | * | 11/1964 | Patten ................... | A01K 1/0236 119/497 |
| 3,916,836 A | * | 11/1975 | Justl ....................... | A01K 31/06 119/428 |
| 4,384,547 A | * | 5/1983 | Mattox ................... | A01K 31/06 119/464 |
| 5,865,147 A | | 2/1999 | Rubin | |
| 7,174,851 B2 | * | 2/2007 | Bonner ................ | A01K 1/0035 119/416 |
| 8,286,591 B2 | * | 10/2012 | Moffett-Chaney .... | A01K 1/035 119/484 |

(Continued)

FOREIGN PATENT DOCUMENTS

| | | |
|---|---|---|
| CN | 203555000 | 4/2014 |
| CN | 104763256 | 7/2015 |

OTHER PUBLICATIONS

Cat Tales Zoological Part 2 Hand Feeding a Lion (https://www.youtube.com/watch?v=4Bzh1SLOMdw), published Jul. 6, 2011, accessed Mar. 21, 2018.*

(Continued)

*Primary Examiner* — Kathleen I Alker
(74) *Attorney, Agent, or Firm* — B. Craig Killough; Barnwell Whaley Patterson & Helms

(57) ABSTRACT

A method of feeding a carnivore by untrained persons while providing safety the animal and the person feeding the animal. An enclosure for the animal has a transparent or substantially transparent barrier observation barrier. The observation barrier has a void formed therein into which a piece of meat may be pushed, such as by pushing with a finger of a person. The piece of meat is elongated and may be pushed through the void until a portion of the meat exits the void on the side of the barrier in which the carnivore is located. The void is of sufficient length that the user's finger will not exit the void on the side of the barrier in which the carnivore is located. The transparent or substantially transparent barrier provides the illusion that the person is feeding the animal by hand.

14 Claims, 3 Drawing Sheets

(56) References Cited

U.S. PATENT DOCUMENTS

| 2007/0227462 | A1 | 10/2007 | Huff | |
|---|---|---|---|---|
| 2010/0024736 | A1 | 2/2010 | Davis | |
| 2010/0071628 | A1* | 3/2010 | Wells | A01K 1/0107 119/169 |
| 2010/0175631 | A1* | 7/2010 | Bennatt | A01K 1/033 119/472 |
| 2012/0077159 | A1* | 3/2012 | Araujo | A01K 1/031 434/236 |
| 2013/0019808 | A1* | 1/2013 | Lathim | A01K 5/0135 119/51.01 |
| 2015/0250134 | A1* | 9/2015 | Hicks | A01K 1/03 119/246 |

OTHER PUBLICATIONS

Diet Feeding and Nutritional Care of Captive Tigers Lions and Leopards (http://www.2ndchance.info/bigcatdiet.htm), published Mar. 26, 2015, accessed Mar. 21, 2018.*

Man v. Lion (http://natgeotv.com/asia/man-v-lion/galleries/the-little-clear-acrylic-box), published Jul. 3, 2015, accessed Mar. 21, 2018.*

Tracker Boone Smith Gets Face-to-Face With Lions in New Feature About Big Cats (https://www.huffingtonpost.com/2014/10/17/big-cat-week_n_5999278.html), published Jul. 14, 2015, accessed Mar. 21, 2018.*

Otter pleasure to meet you! (http://www.dailymail.co.uk/news/article-2528565/Otter-pleasure-meet-Marine-park-offers-visitors-chance-shake-hands-adorable-animals.html), published Dec. 23, 2013, accessed Mar. 20, 2018.*

Bringing down the bars (http://www.iom3.org/materials-world-magazine/news/2012/mar/13/bringing-down-bars-new-zoo-enclosure-methods-and-materials), published Nov. 14, 2015, accessed Mar. 20, 2018.*

Through Golden Eyes (http://throughgoldeneyes.blogspot.com/2015/04/lunch-with-lion.html), published Apr. 3, 2015, accessed Mar. 20, 2018.*

London Zoo Land of the Lions (https://www.themanufacturer.com/articles/roaring-success-for-new-romag-glass-viewing-screen-at-london-zoo/), published May 11, 2016, accessed Mar. 20, 2018.*

Big Cat Experience (https://www.youtube.com/watch?v=6LAWF_0zHbc), published Jun. 20, 2016, accessed Mar. 21, 2018.*

Noboribetsu Bear Park—Feeding bear behind the glass, https://www.youtube.com/watch?v=vLLZsBYhBGg, published Feb. 17, 2014, accessed Jul. 18, 2018.*

Living Treasures Animal Park, https://coolestfamilyontheblock.com/2011/06/17/living-treasures-animal-park/, published Aug. 27, 2011, accessed Jul. 18, 2018.*

PCT International Search Report and Written Opinion, dated Feb. 3, 2017.

* cited by examiner

METHOD OF FEEDING A CARNIVORE AND DEVICE

FIELD OF THE INVENTION

This invention relates to feeding of animals generally, and is more specifically directed to a method of feeding a carnivore held in captivity.

BACKGROUND OF THE INVENTION

Animals are frequently placed in exhibits, such as zoos. The animals are contained so that they may be observed by humans. Observers wish to have the opportunity to interact with the animals. Any such interaction must be provided in a manner that is safe to both the animals and the human observers.

One activity that is desirable for many observers is to feed the animal. For the casual observer who is not trained in feeding animals, this activity may be dangerous, particularly where large carnivores are being fed. A method and device that permits safe feeding of exhibited carnivores by untrained observers is needed.

SUMMARY OF THE INVENTION

The present invention is a method of feeding a carnivore by untrained persons, while providing safety for the animal and the person feeding the animal. An enclosure is formed that comprises a transparent or substantially transparent observation barrier. The observation barrier has a void formed therein into which a piece of meat may be pushed, such as pushing by a finger of a person feeding the carnivore.

The piece of meat is elongated and may be pushed through the void until a portion of the elongated meat exits the void on the side of the barrier in which the carnivore is located. The carnivore grasps the elongated meat. The void in the barrier is of sufficient length that the user's finger will not exit the void on the side of the barrier in which the carnivore is located. The transparent or substantially transparent barrier provides the illusion that the person is feeding the animal by hand.

BRIEF DRAWING DESCRIPTION

DESCRIPTION OF PREFERRED EMBODIMENTS

Figure 1:
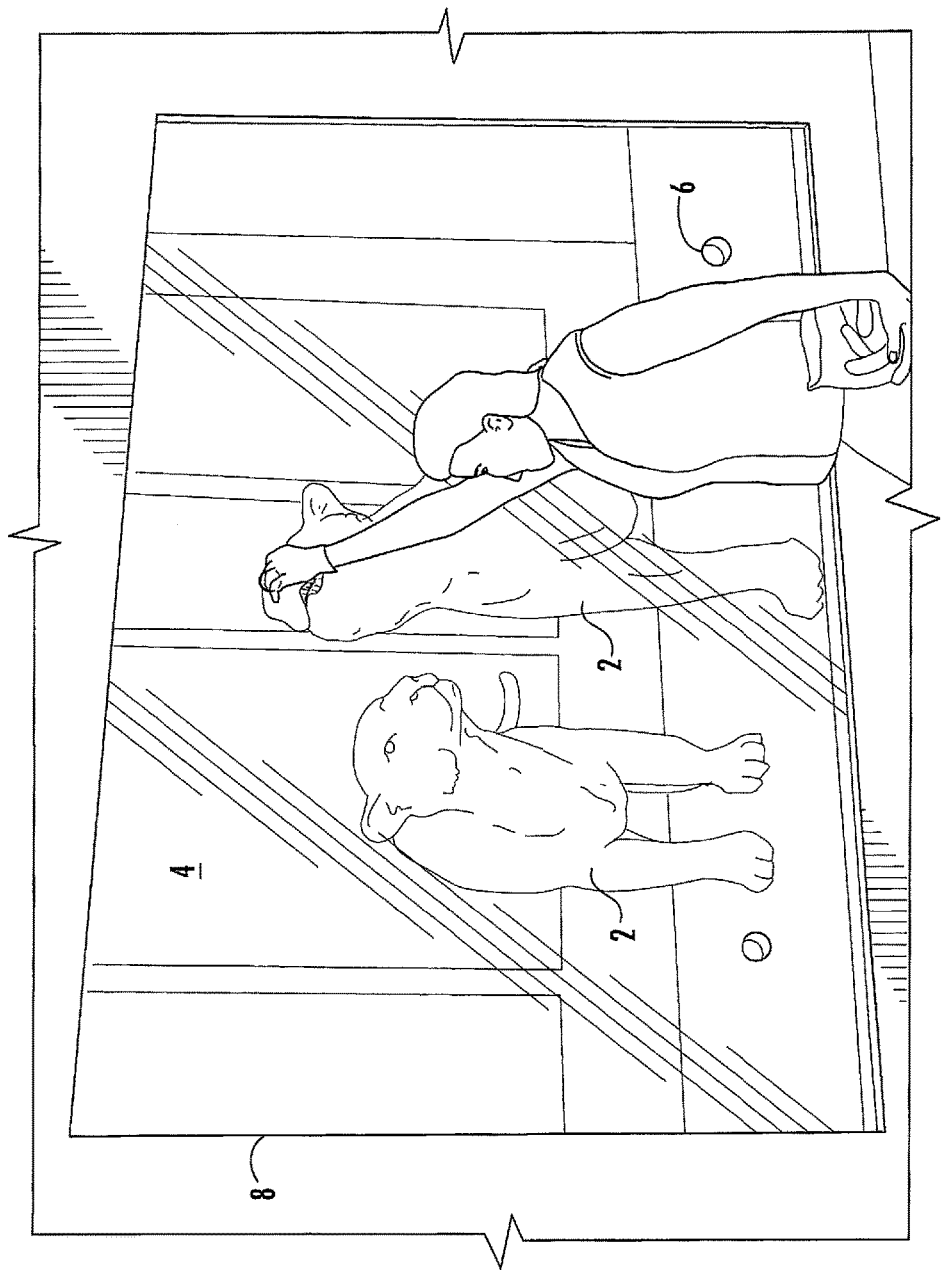
FIG. 1 illustrates carnivores contained within a barrier, with the carnivores separated from a human observer by a transparent or substantially transparent barrier.

FIG. 1 shows carnivores 2 contained within an enclosure 8. A portion of the enclosure is a barrier 4 formed of a transparent or substantially transparent material that allows observation of the carnivores. Human feeders/observers may observe the carnivores through the barrier, while remaining on an opposite side of the barrier from the carnivores for safety reasons.

Figure 2:
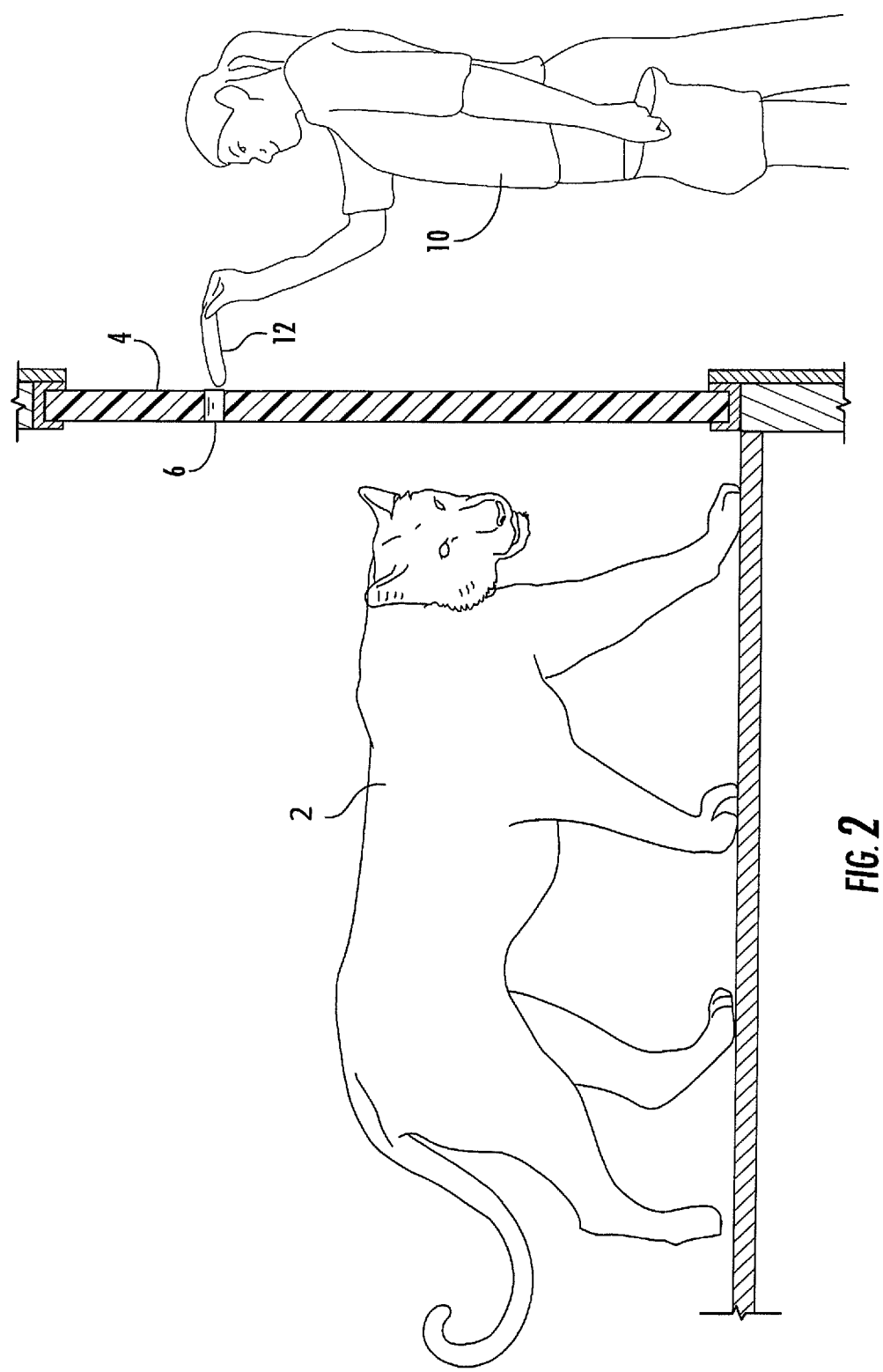
FIG. 2 is an elevation demonstrating a carnivore separated by the barrier from a human who is feeding the carnivore, with the barrier shown as a sectioned view.

The barrier has one or more voids 6 formed in the transparent or substantially transparent barrier. In most embodiments, the voids are round in cross section, but the voids could be formed in other shapes consistent with the requirements of the invention as disclosed herein. The voids extend completely through the barrier from a first side of the barrier to the opposite side of the barrier as shown in FIG. 2. According to the method of the invention, an elongated piece of meat 12 is inserted into the void from the side of the void (the insertion side of the void) in which the observer and feeder 10 is positioned.

Figure 3:
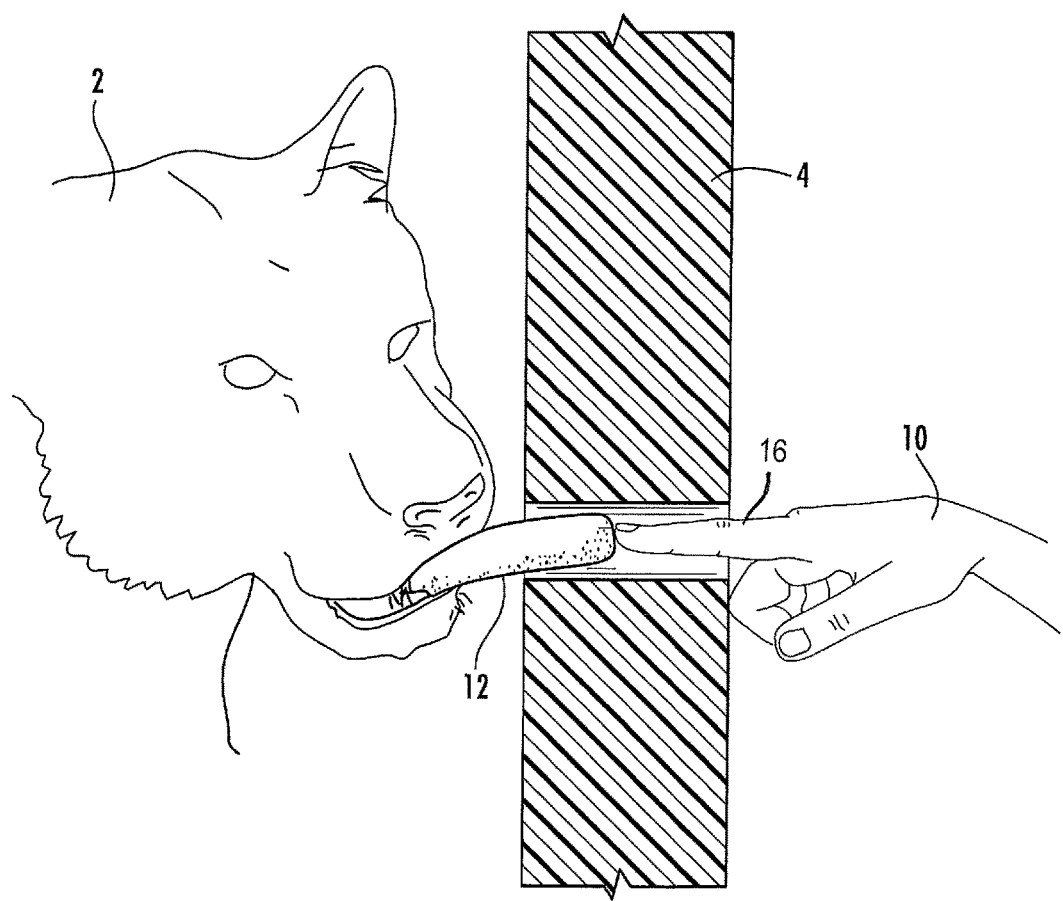
FIG. 3 is a partial view of the barrier showing an elongated piece of meat pushed through a void in the sectioned barrier by a finger of the human observer.

The elongated piece of meat is pushed by an object, such as by the feeder's finger 16, to advance the elongated piece of meat through the void. As a portion of the meat exits the void on the side (the exit side of the void) of the barrier where the carnivore is present, the carnivore will grasp the meat in his or her mouth, and pull the elongated piece of meat out of the void for consumption by the carnivore. FIG. 3. The piece of meat is typically grasped by the carnivore while the feeder's finger is still within the void.

The barrier 4 is preferred to be about ten (10) centimeters thick, which provides a sufficient thickness so that a finger of most feeders will not extend completely through the void. However, the thickness of the barrier may be greater than ten (10) centimeters, but is preferred to less than about fifteen (15) centimeters, so that a feeling of closeness feeder to the animal is present.

Typically, human observers will not perceive that the barrier is as thick as ten to fifteen (10-15) centimeters, but will perceive that the barrier, particularly formed without substantial flaws in the material from which it is formed, is of substantially less thickness. The illusion created by the method is that the feeder is directly feeding the carnivore substantially as if the barrier is not present, particularly when the meat is grasped by the carnivore with the feeder's finger in the void.

It is preferred that the void be at least 2.5 centimeters to 4 centimeters across as a minimum dimension. If the void is round, the void will have a preferred diameter of 2.5 centimeters to 5 centimeters, and may not be greater than 4 centimeters in diameter. The elongated meat is formed in a dimension that is suitable for the void.

The elongated meat has a length that is preferably in excess of the length of the void, but will have a cross sectional dimension that is not larger than any cross sectional dimension of the void, with sufficient spacing from the sides of the void to allow the elongated meat to be easily pushed through the void with a finger. By way of example, the meat may be 12 to 20 centimeters in length, with no cross sectional dimension greater than 2 to 3.5 centimeters, in depending upon the length and cross sectional dimension of the void. The void formed in the barrier is sufficiently large to permit the piece of elongated meat to be pushed through the void, preferably by a single finger, but the opening of the void on the side of the animal should not be sufficiently large to encourage or permit a tooth of the carnivore to enter the void.

The barrier may be formed of any transparent or substantially transparent material that is mounted to the animal's enclosure in a manner that prevents the animal from escaping. In a preferred embodiment, the barrier is formed of acrylic, which should be formed without material flaws to enhance the illusion of closeness to the carnivore. The barrier is preferably formed of high tensile acrylic.

The term "substantially transparent" is used herein to mean a material that is tinted or coated to reduce the passage of some wavelengths of light. For example, a barrier coated with a material to retard the passage of ultraviolet wavelengths.

The elongated meat may be sausage or similar meat, and is preferably contained within a casing. The meat is chosen according to meat that is particularly appetizing and nutritious for the carnivore that is being fed. The elongated meat is preferred to be relatively uniform in size from piece of elongated meat to the next piece of elongated meat for the purpose of ensuring easy passage through the void in the barrier, and for the purpose of measuring animal nutrition.

The device may be used to feed many species of carnivores. As shown in the drawings, the carnivore may be a feliform, such as a tiger.

What is claimed is:

1. A method of feeding a carnivore, comprising the steps of:
   forming a barrier of transparent or substantially transparent material, the barrier having a void formed therein that extends completely through the barrier from a first side of the barrier to an opposite side of the barrier, the void comprising an opening in an insertion side of the void that is present on the first side of the barrier and an opening in an exit side of the void that is present on the opposite side of the barrier;
   inserting a piece of elongated meat into the opening in the void that is present in the insertion side of the void and pushing the piece of elongated meat through the length of the void until a portion of the meat exits the opening in the exit side of the void, wherein the length of the void formed in the barrier exceeds a length of an object pushing the piece of elongated meat through the void, and the length of the void is the distance from the opening in the insertion side of the void to the opening in the exit side of the void; and
   feeding the piece of elongated meat to a carnivore situated on the opposite side of the barrier.

2. A method of feeding a carnivore as described in claim 1, wherein the object pushing of the piece of elongated meat through the void is a human finger inserted into the void.

3. A method of feeding a carnivore as described in claim 2, further comprising a step of the carnivore grasping the meat while the human finger is present in the void.

4. A method of feeding a carnivore as described in claim 1, further comprising a step of the carnivore grasping the meat.

5. A method of feeding a carnivore as described in claim 1, wherein the elongated meat is not less than 7.5 centimeters in length.

6. A method of feeding a carnivore as described in claim 1, wherein the meat is contained in an elongated casing.

7. A method of feeding a carnivore as described in claim 1, wherein the void is not more than 15 centimeters in length and not more than 5 centimeters across a width of the void.

8. A method of feeding a carnivore as described in claim 1, wherein the barrier is formed of acrylic.

9. A method of feeding a carnivore as described in claim 1, wherein the carnivore is a feliform.

10. A method of feeding a carnivore as described in claim 1, wherein the barrier is formed of high tensile acrylic.

11. A method of feeding a carnivore as described in claim 1, wherein the void formed in the barrier is not less than 10 centimeters in length and not less than 2.5 centimeters in width along the entire length of the void.

12. A method of feeding a carnivore as described in claim 1, wherein the opening formed in the insertion side of the void formed in the barrier is sufficiently large to permit the piece of elongated meat to be inserted into the void but the opening in the exit side of the void is not sufficiently large to permit a tooth of the carnivore to enter the void.

13. A method of feeding a carnivore as described in claim 1, wherein the void formed in the barrier is not less than 10 centimeters in length and not less than 2.5 centimeters in diameter in width along the entire length of the void.

14. A method of feeding a carnivore as described in claim 1, wherein the void formed in the barrier is not less than 10 centimeters in length and not less than 2.5 centimeters in diameter along the entire length of the void and the void is not more than 15 centimeters in length and not more than 5 centimeters in diameter along the entire length of the void.

* * * * *